United States Patent
Yamada et al.

(10) Patent No.: US 9,569,597 B2
(45) Date of Patent: Feb. 14, 2017

(54) INFORMATION PROCESSING APPARATUS AND METHOD, PROGRAM, AND INFORMATION PROCESSING SYSTEM

(71) Applicant: SONY CORPORATION, Tokyo (JP)

(72) Inventors: Tsukuru Yamada, Tokyo (JP);
Masatoshi Yamagiwa, Tokyo (JP);
Yoshitaka Nakamura, Tokyo (JP);
Hakuhei Ryou, Saitama (JP); Akihiro Kawachino, Kanagawa (JP); Takehisa Gokaichi, Kanagawa (JP); Koichi Uchida, Saitama (JP)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 14/386,163

(22) PCT Filed: Apr. 10, 2013

(86) PCT No.: PCT/JP2013/060800
§ 371 (c)(1),
(2) Date: Sep. 18, 2014

(87) PCT Pub. No.: WO2013/161563
PCT Pub. Date: Oct. 31, 2013

(65) Prior Publication Data
US 2015/0113660 A1    Apr. 23, 2015

(30) Foreign Application Priority Data

Apr. 24, 2012 (JP) ................................ 2012-099057

(51) Int. Cl.
G06F 21/10   (2013.01)
H04L 29/08   (2006.01)

(52) U.S. Cl.
CPC .............. *G06F 21/105* (2013.01); *G06F 21/10* (2013.01); *H04L 67/10* (2013.01)

(58) Field of Classification Search
CPC .............. H04N 21/2387; H04N 7/1675; H04N 21/234327; H04N 21/23476; H04N 21/44055; H04N 21/4627; H04N 21/631; H04N 19/34; H04N 19/68; H04N 21/440227; G06F 21/10; G06F 21/105; G06F 21/51; G06F 2221/2141; H04L 67/10; H04L 2463/103; H04L 63/083; H04L 63/123; H04L 9/06; H04L 2209/603; G06Q 20/382
See application file for complete search history.

(56) References Cited

U.S. PATENT DOCUMENTS 6,931,534 B1     8/2005   Jändel et al.
2002/0073214 A1  6/2002   Iinuma
(Continued)

FOREIGN PATENT DOCUMENTS

EP    1 202 149 A2    5/2002
JP    2004-272824 A   9/2004
(Continued)

OTHER PUBLICATIONS

Zhang et al.; A Scalable Digital Rights Management Framework For Large-Scale Content Distribution; 2005; Retrieved from the Internet <URL: ieeexplore.ieee.org/xpls/abs_all.jsp?arnumber=1595521&tag=1>; pp. 1-4 as printed.*

(Continued)

*Primary Examiner* — Morshed Mehedi
*Assistant Examiner* — Shu Chun Gao
(74) *Attorney, Agent, or Firm* — Oblon, McClelland, Maier & Neustadt, L.L.P.

(57) ABSTRACT

There is provided an information processing apparatus, including a storage section which stores a first image, which is an image of a format requiring license information in reproduction, to which reproduction is performed by a (Continued)

reproduction apparatus after being acquired, a conversion section which converts the first image into a second image of a format not requiring license information in reproduction, which is an image with content the same as content of the first image, and a distribution section which distributes the second image to the reproduction apparatus to be reproduced, during acquisition of the first image.

14 Claims, 11 Drawing Sheets

(56) References Cited

U.S. PATENT DOCUMENTS

| | | | |
|---|---|---|---|
| 2004/0196972 A1* | 10/2004 | Zhu | G06Q 20/382 380/45 |
| 2006/0080535 A1 | 4/2006 | Elazar et al. | |
| 2010/0046918 A1 | 2/2010 | Takao et al. | |
| 2010/0046929 A1 | 2/2010 | Takao et al. | |
| 2010/0046930 A1 | 2/2010 | Takao et al. | |
| 2010/0046931 A1 | 2/2010 | Takao et al. | |
| 2010/0149570 A1 | 6/2010 | Kamiya et al. | |
| 2010/0169347 A1* | 7/2010 | Dasher | G06F 17/30817 707/758 |
| 2010/0322591 A1 | 12/2010 | Takao et al. | |
| 2011/0002593 A1 | 1/2011 | Takao et al. | |
| 2011/0002662 A1 | 1/2011 | Takao et al. | |
| 2011/0271354 A1 | 11/2011 | Elazar et al. | |
| 2012/0066709 A1* | 3/2012 | Ahn | H04N 13/0048 725/31 |
| 2012/0147425 A1 | 6/2012 | Kamiya et al. | |

FOREIGN PATENT DOCUMENTS

| | | |
|---|---|---|
| JP | 2010-136227 A | 6/2010 |
| JP | 2011-100539 A | 5/2011 |
| JP | 2012-039436 A | 2/2012 |
| WO | WO 00/31964 A1 | 6/2000 |

OTHER PUBLICATIONS

Extended European Search Report issued Dec. 7, 2015 in Patent Application No. 13781501.5.

\* cited by examiner

INFORMATION PROCESSING APPARATUS AND METHOD, PROGRAM, AND INFORMATION PROCESSING SYSTEM

TECHNICAL FIELD

The present disclosure relates to an information processing apparatus and method, a program and an information processing system, and more specifically relates to an information processing apparatus and method, a program and an information processing system which can cause a client terminal, which is acquiring an image or which does not have a license of the format used for the image, to reproduce the image, while reducing the load of a server.

BACKGROUND ART

In the past, there have been image sharing services in which a plurality of users can share images online. For example, in the image sharing service disclosed in Patent Literature 1, a client terminal of a prescribed user transmits an image to a server, and the server receives and forwards this image to a different user of a distribution destination. Then, the client terminal of the user of the distribution destination receives and reproduces this image. In this way, images are shared between users.

CITATION LIST

Patent Literature

Patent Literature 1: JP 2012-39436A

SUMMARY OF INVENTION

Technical Problem

Usually, only an image which is appropriate for the specifications of the unit itself is able to be reproduced, from among images of formats which have a license. Therefore, a server judges the presence or absence of a license, for the client terminal of the distribution destination, prior to distribution of an image, and it may be necessary to execute a process which converts the image so as to be appropriate for the specifications or the like of the client terminal of the distribution destination.

In addition, the client terminal is not able to reproduce an image from the server while being acquired, even if it is an image capable of being reproduced.

The present disclosure is performed by considering such a situation, and is able to reproduce an image by a client terminal, which is acquiring the image or which does not have a license of the format used for the image, while reducing the load of a server.

Solution to Problem

According to a first aspect of the present disclosure, there is provided an information processing apparatus, including a storage section which stores a first image, which is an image of a format requiring license information in reproduction, to which reproduction is performed by a reproduction apparatus after being acquired, a conversion section which converts the first image into a second image of a format not requiring license information in reproduction, which is an image with content the same as content of the first image, and a distribution section which distributes the second image to the reproduction apparatus to be reproduced, during acquisition of the first image.

The storage section may store information related to a user specified by a user who has provided the first image in association with the first image. The distribution section may distribute the first image and the second image to the reproduction apparatus operated by a specified user.

The storage section may store a thumbnail image of the first image. The distribution section may distribute the thumbnail image to the reproduction apparatus, and may distribute the second image, obtained by converting the first image selected by using the thumbnail image, to the reproduction apparatus.

The second image may be an image with a data amount less than a data amount of the first image, and to which streaming reproduction is performed.

The distribution section may transmit information of a reproduction position to the reproduction apparatus, in accordance with an inquiry of a reproduction position of the second image performed from the reproduction apparatus at the time when acquisition of the first image has finished.

An information processing method and program of the first aspect of the present disclosure are a method and program corresponding to the above described information processing apparatus of the first aspect of the present disclosure.

The information processing method and program of the first aspect of the present disclosure includes steps of storing a first image, which is an image of a format requiring license information in reproduction, to which reproduction is performed by a reproduction apparatus after being acquired, converting the first image into a second image of a format not requiring license information in reproduction, which is an image with content the same as content of the first image, and distributing the second image to the reproduction apparatus to be reproduced, during acquisition of the first image.

A reproduction apparatus of a second aspect of the present disclosure includes a reception section which receives a first image, which is an image of a format requiring license information in reproduction, to which reproduction is performed after being acquired, and receives a second image of a format not requiring license information in reproduction, which is an image with content the same as content of the first image, during acquisition of the first image, a storage section which stores the received first image, and a reproduction section which starts reproduction of the received second image during acquisition of the first image.

In the case where acquisition of the first image has finished, and it has the license information, the reproduction section may reproduce the first image.

The reproduction apparatus may further includes a display control section which controls display of the first image and the second image reproduced by the reproduction section.

The reception section may receive a thumbnail image of the first image. The display control section may further cause the thumbnail image to be displayed side by side within a window.

The reception section may receive the second image, obtained by converting the first image selected by a user by using the thumbnail image displayed by the display control section. The display control section may cause a window different to the window displaying the thumbnail image to display the second image reproduced by the reproduction section.

The second image may be an image with a data amount less than a data amount of the first image, and to which streaming reproduction is performed.

The reproduction apparatus may further includes a transmission section which transmits information related to an inquiry of a reproduction position of the second image to an information processing apparatus which transits the first image and the second image, at the time when acquisition of the first image has finished. The reception section may receive the information of the reproduction position transmitted from the information processing apparatus in accordance with an inquiry. The reproduction section may reproduce the second image by setting a position represented by the information of the reproduction position as a start position.

A reproduction method and program of the second aspect of the present disclosure are a method and program corresponding to the above described reproduction apparatus of the second aspect of the present disclosure.

The reproduction method and program of the second aspect of the present disclosure may include the steps of receiving a first image, which is an image of a format requiring license information in reproduction, to which reproduction is performed after being acquired, and receiving a second image of a format not requiring license information in reproduction, which is an image with content the same as content of the first image, during acquisition of the first image, storing the received first image, and starting reproduction of the received second image during acquisition of the first image.

An information processing system of a third aspect of the present disclosure includes a server including a first storage section which stores a first image, which is an image of a format requiring license information in reproduction, to which reproduction is performed by a reproduction apparatus after being acquired, a conversion section which converts the first image into a second image of a format not requiring license information in reproduction, which is an image with content the same as content of the first image, and a distribution section which distributes the second image to the reproduction apparatus to be reproduced, during acquisition of the first image, and a client terminal including a reception section which receives the first image, and receives the second image during acquisition of the first image, a second storage section which stores the received first image, and a reproduction section which starts reproduction of the received second image during acquisition of the first image.

In an information processing system of the third aspect of the present disclosure, in a server, a first image, which is an image of a format requiring license information in reproduction, to which reproduction is performed by a reproduction apparatus after being acquired, is stored, the first image is converted into a second image of a format not requiring license information in reproduction, which is an image with content the same as that of the first image, and the second image is distributed to the reproduction apparatus, during acquisition of the first image. In a client terminal, the first image is received, the second image is received during acquisition of the first image, the received first image is stored, and reproduction of the received second image is started during acquisition of the first image.

Advantageous Effects of Invention

According to the present disclosure, an image is able to be reproduced by a client terminal, which is acquiring the image or which does not have a license of the format used for the image, while reducing the load of a server.

DESCRIPTION OF EMBODIMENTS

Configuration Example of the Information Processing System 1

Figure 1:
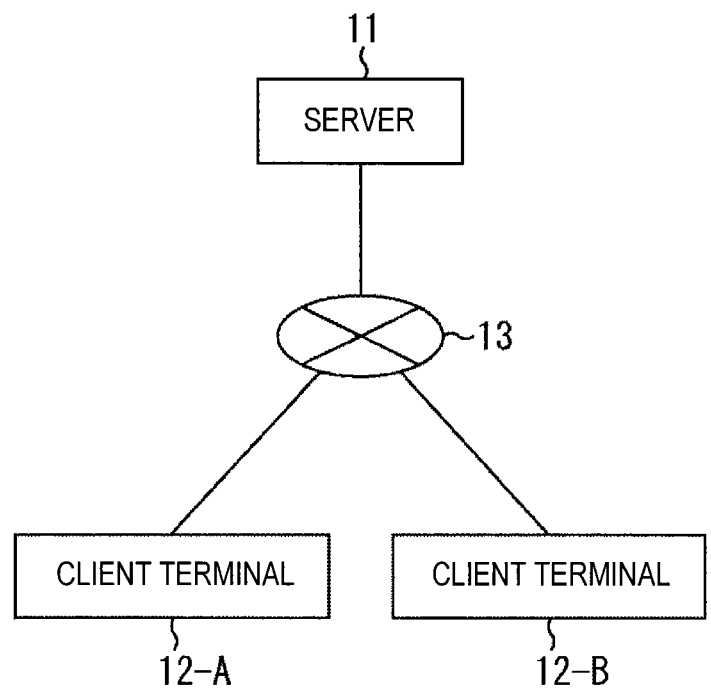
FIG. 1 is a block diagram which shows a configuration example of an information processing system.

FIG. 1 is a block diagram which shows a configuration example of an information processing system 1.

The information processing system 1 is constituted by having a server 11, a client terminal 12-A and a client terminal 12-B mutually connected via a network 13 constituted of the internet or the like. In the information processing system 1, sharing of images is performed between a user A who is the user of the client terminal 12-A and a user B who is the user of the client terminal 12-B.

Hereinafter, in the case where it may not be necessary to individually distinguish the client terminal 12-A and the client terminal 12-B, they will be collectively called a client terminal 12. While only two client terminals 12 are shown in FIG. 1, the number of client terminals 12 is not limited to this.

In the example of FIG. 1, the user A provides (uploads) an image taken by a digital camera or the like from the client terminal 12-A to the server 11, the user B operates the client terminal 12-B and accesses the server 11, and inspects the image provided by the user A. The client terminal 12 is a terminal such as a personal computer.

A file of a still image such as a JPEG file or a file of a moving image such as an AVC/HD file is included in the image provided by the user A. The image provided by the user A is an image of a format requiring a license in reproduction. For example, at the time when reproducing an AVC/HD file, it may be necessary for a license of an AVC/HD format to be acquired in the client terminal 12-B operated by the user B. Hereinafter, the case of sharing moving images will mainly be described.

The server 11 receives the image provided from the client terminal 12-A, and converts it to an image of a format not requiring a license in reproduction, by setting the received image as an actual image. The converted image, which is the image obtained by converting the actual image, becomes an image of content the same as that of the actual image. The converted image is an image with a data amount less than that of the actual image, and to which streaming reproduction is performed, such as Flash.

The server 11 stores the actual image and the converted image. User information of the user B, which has been specified as the distribution destination of the actual image, is associated with the actual image. An ID or the like of the user B registered in advance is included in the user information. At the time when providing the actual image, information of the user B, which has been specified by user A as the distribution destination, is transmitted, along with the actual image, from the client terminal 12-A.

In the case where the server 11 is accessed from the client terminal 12-B, the actual image, which has been provided by the user A as that to be distributed to the user B, is distributed to the client terminal 12-B, and a thumbnail image generated in advance based on the actual image is distributed.

In the client terminal 12-B, acquisition (downloading) of the actual image transmitted from the server 11 is started, and a window including thumbnail images or the like is displayed.

Figure 2:
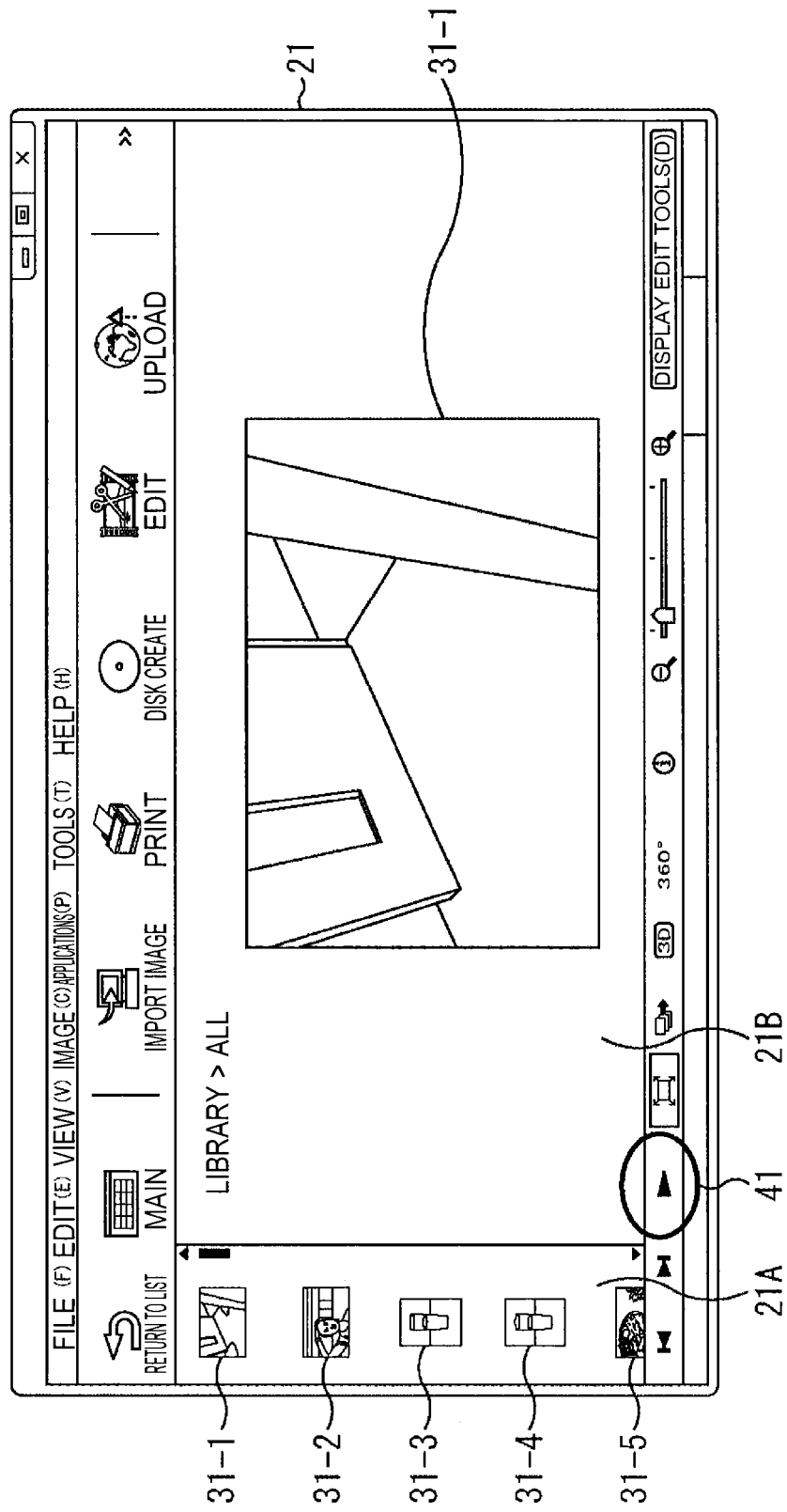
FIG. 2 is a figure which shows a display example of a screen of a client terminal.

FIG. 2 is a figure which shows an example of a window displayed on the client terminal 12-B.

Thumbnail images 31-1 through to 31-5 transmitted from the server 11 are displayed side by side in a region 21A formed on the left side of the window 21. The user B causes a cursor to be moved by operating a mouse or the like, and can select a prescribed thumbnail image.

An image selected from among the thumbnail images displayed in the region 21A is displayed enlarged in a region 21B formed in the approximate center of the window 21. In the example of FIG. 2, the thumbnail image 31-1 selected from the region 21A is displayed enlarged.

A reproduction button 41 is displayed on the lower side of the window 21. The reproduction button 41 is a button which is operated at the time when specifying reproduction of an actual image selected by using the thumbnail images.

In the case where the reproduction button is pressed in that state of FIG. 2, and reproduction of the actual image represented by the thumbnail image 31-1 is specified, reproduction of the actual image is started, at the time when data of the actual image has been acquired, and the client terminal 12-B has a license required for reproduction of the actual image. Each frame of a moving image such as AVC/HD obtained by reproducing the actual image is displayed, instead of the enlarged image of the thumbnail image 31-1, in the region 21B of the window 21.

In this way, the user B can view a high-quality moving image such as ADV/HD, which has been provided to the server 11 by the user A.

On the other hand, in the case where reproduction of the actual image has been specified in the state of FIG. 2, streaming reproduction of a converted image is started, at the time when acquisition of data of the actual image has not been completed, or at the time where the client terminal 12-B does not have a license required for reproduction of the actual image. In the client terminal 12-B, distribution of the converted image generated based on the actual image to which reproduction is specified is requested to the server 11, and streaming reproduction of the converted image, which has been distributed from the server 11 to the client terminal 12-B, is performed in accordance with this request.

Figure 3:
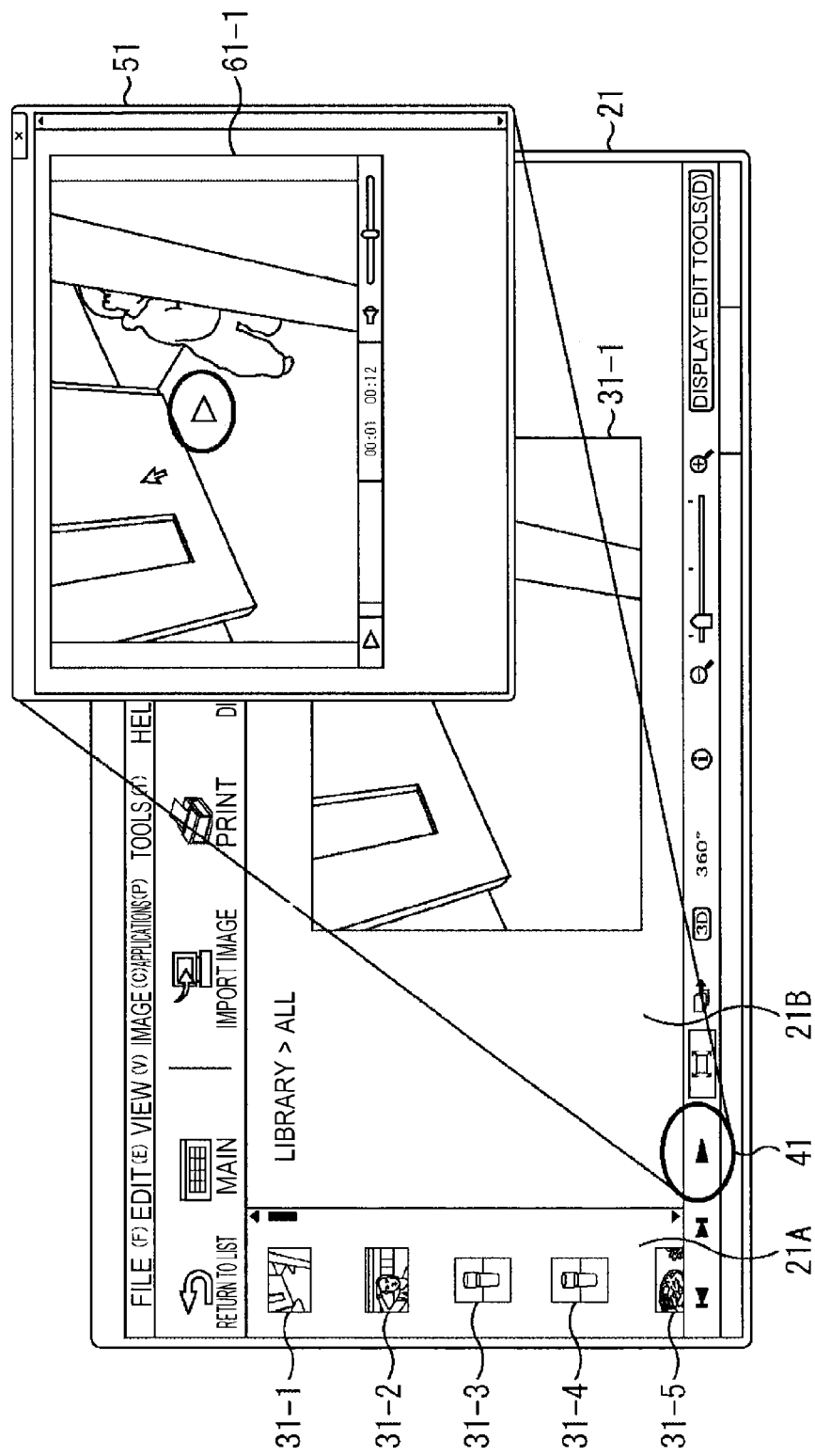
FIG. 3 is a figure which shows another display example of a screen of the client terminal.

FIG. 3 is a figure which shows a display example of a converted image.

As shown in FIG. 3, a window 51, which is a window different to that of the window 21, is displayed superimposed on the window 21, and a converted image 61-1 to which streaming reproduction has been performed is displayed in the window 51. As described above, since the converted image is an image which has a data amount less than that of the actual image, it becomes possible to start reproduction while acquisition of the actual image is being performed. Further, since the converted image is an image not requiring a license for reproduction, it becomes possible to be reproduced even in the case where the client terminal 12-B does not have a license.

In this way, the user B can browse a converted image of content the same as that of the actual image, even if during acquisition of the actual image to be reproduced, or even in the case where there is no license for the client terminal 12-B.

As described above, in the information processing system 1, an actual image is distributed from the server 11, regardless of the presence or not of a license of the client terminal 12. It may not be necessary for the server 11 to judge the presence or not or a license of the client terminal 12 of a distribution destination, and in this way, it becomes possible to reduce the load of the server 11.

Further, the server 11 stores all provided images by uniformly converting them into converted images of a format not requiring a license. Also, in the case where a reproduction instruction of a converted image has been received from the client terminal 12, the server 11 distributes such a converted image to the client terminal 12. Therefore, since it may not be necessary for the server 11 to execute a process which converts an image so as to be appropriate for each of the specifications or the like of the client terminal of the distribution destination, the load will be reduced.

On the other hand, the client terminal 12 can perform streaming reproduction of the converted image distributed from the server 11, even if during acquisition of the actual image from the server 11, or in the case where there is no license. Therefore, a user can browse the converted image with content the same as that of the actual image, even if during acquisition of the actual image, or even in the case where there is no license.

It is preferable that the client terminal 12-B reproduces the actual image rather than the converted image, from the following reasons. First, since the actual image is reproduced after being acquired in the client terminal 12-B, there will be no influence on the load of the network 13 such as for that of the converted image to which streaming reproduction is performed. Further, the actual image has a higher quality than that of the converted image. In addition, the client terminal 12-B can process and retain editing and processing for the actual image.

Note that, the client terminal 12-B can acquire the actual image regardless of the presence or not of a license. Therefore, the client terminal 12-B can reproduce the actual image, by acquiring a license, after acquisition of the actual image has been completed. For example, acquisition of a license is performed by a user, who has purchased a camera of the maker which manages the server 11, by connecting the camera to the client terminal 12.

[Hardware Configuration Example of the Server 11]

Figure 4:
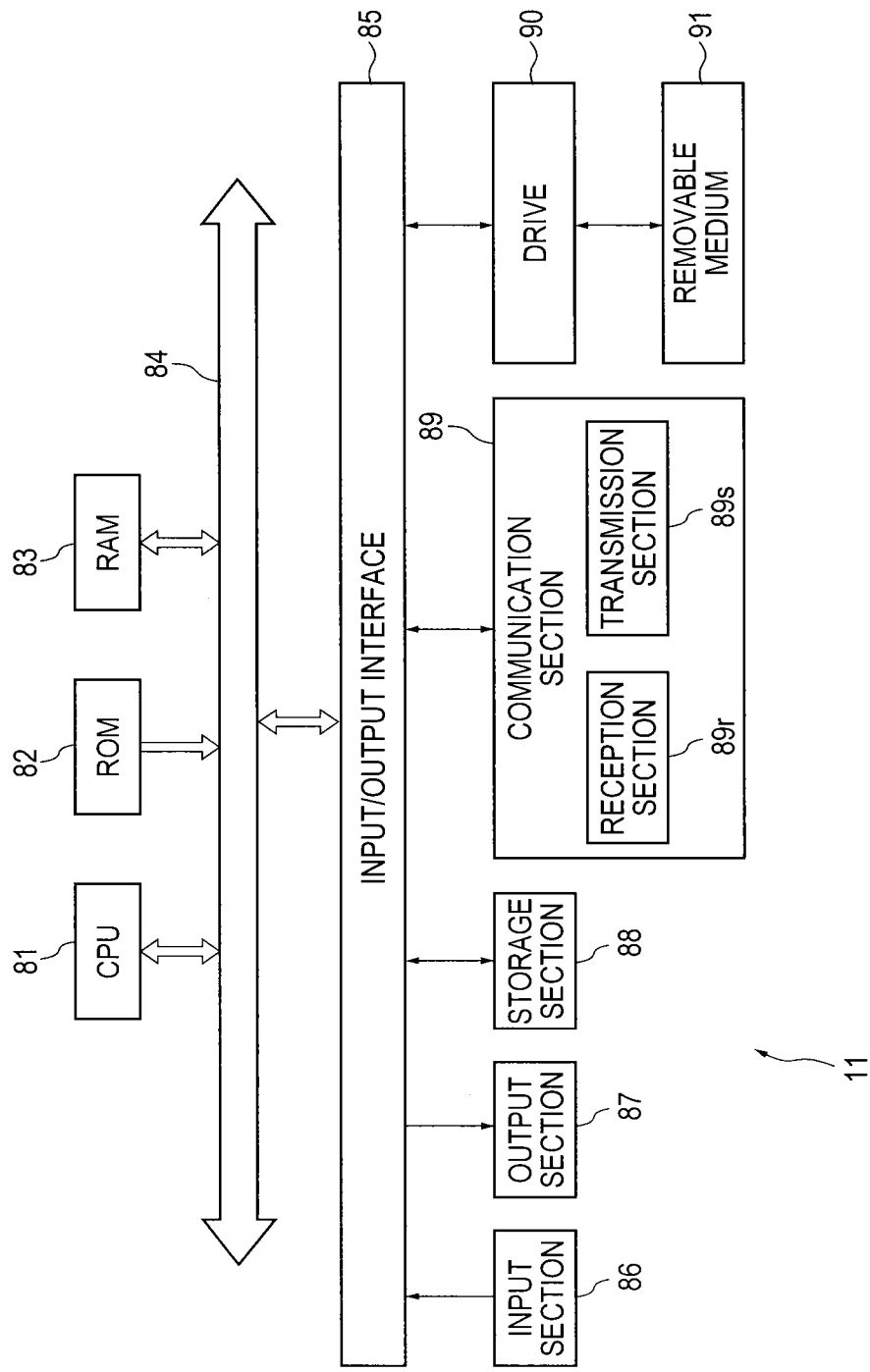
FIG. 4 is a block diagram which shows a configuration example of the hardware of a server.

FIG. 4 is a block diagram which shows a configuration example of the hardware of the server 11.

The server 11 includes a CPU (Central Processing Unit) 81, a ROM (Read Only Memory) 82, a RAM (Random Access Memory) 83, a bus 84, an input/output interface 85, an input section 86, an output section 87, a storage section 88, a communication section 89, and a drive 90.

The CPU 81 executes various types of processes in accordance with programs recorded in the ROM 82. Data or the like necessary for the CPU 81 to execute the various types of processes is also arbitrarily stored in the RAM 83.

The CPU 81, the ROM 82 and the RAM 83 are mutually connected via the bus 84. The input/output interface 85 is also connected to this bus 84. The input section 86, the output section 87, the storage section 88 and the communication section 89 are connected to the input/output interface 85.

The input section 86 is constituted of a keyboard, mouse, microphone or the like. The output section 87 is constituted by a display, speaker or the like, and outputs various types of images.

The storage section 88 is constituted, for example, from a hard disk, a nonvolatile memory or the like, and stores user information, actual images, converted images or the like.

The communication section 89 has a reception section 89$r$ and a transmission section 89$s$, and communicates with the client terminal 12 via the network 13. The reception section 89$r$ receives various types of information transmitted from the client terminal 12. The transmission section 89$s$ transmits various types of information to the client terminal 12.

The drive 90 is also connected to the input/output interface 85 as necessary, and a removable medium 91 constituted by an optical disk, a magneto-optical disk, a semiconductor memory or the like is arbitrarily mounted. Computer programs read from the removable medium 91 are installed in the storage section 88 as necessary.

[Hardware Configuration Example of the Client Terminal 12]

Figure 5:
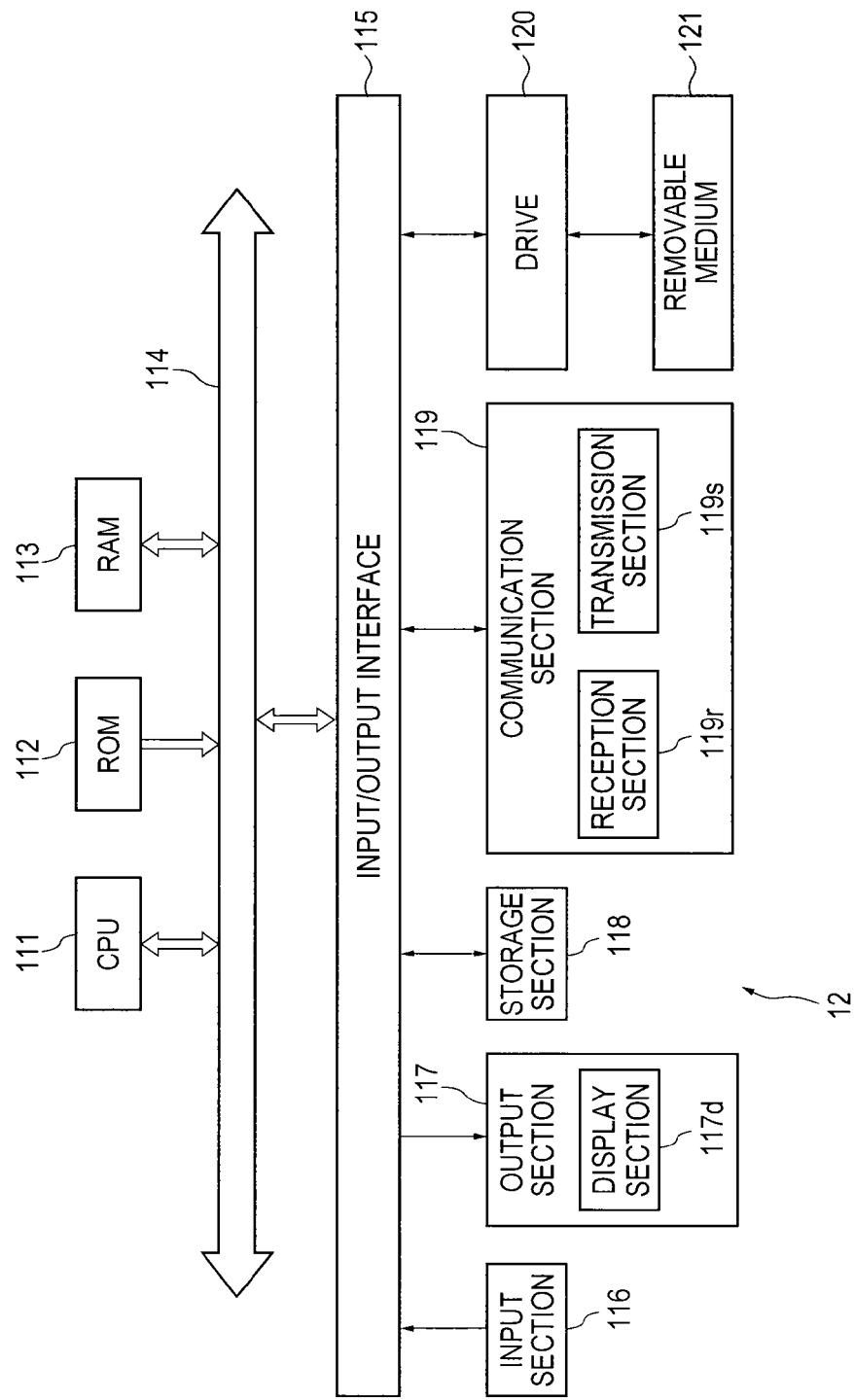
FIG. 5 is a block diagram which shows a configuration example of the hardware of the client terminal.

FIG. 5 is a block diagram which shows a configuration example of the hardware of the client terminal 12.

The client terminal 12 includes a CPU 111, a ROM 112, a RAM 113, a bus 114, an input/output interface 115, an input section 116, an output section 117, a storage section 118, a communication section 119, a drive 120, and a removable medium 121. The client terminal 12 has a configuration basically the same as that of the server 11 of FIG. 4. The overlapping descriptions will be omitted.

The storage section 118 is constituted, for example, from a hard disk, a nonvolatile memory or the like, and stores actual images, information of licenses required for reproduction of the actual images or the like.

A display section 117$d$ which displays images or the like is included in the output section 117.

[Functional Configuration Example of the Server 11 and the Client Terminal 12]

Figure 6:
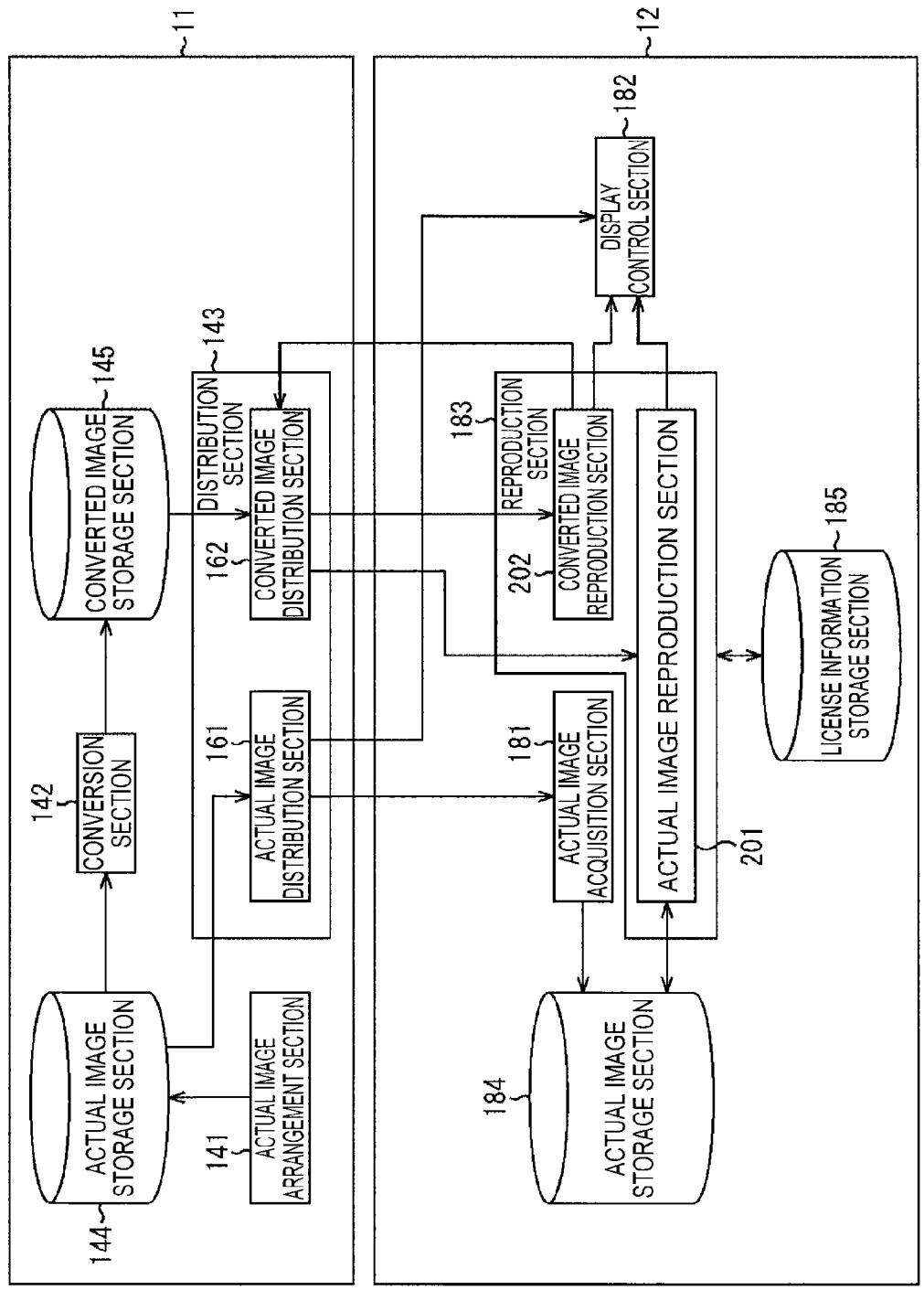
FIG. 6 is a block diagram which shows a functional configuration example of the server and the client terminal.

FIG. 6 is a block diagram which shows a functional configuration example of the server 11 and the client terminal 12.

The server 11 is constituted from an actual image arrangement section 141, a conversion section 142, a distribution section 143, an actual image storage section 144, and a converted image storage section 145. The actual image arrangement section 141, the conversion section 142 and the distribution section 143 are implemented by having prescribed programs executed by the CPU 81, and the actual image storage section 144 and the converted image storage section 145 are implemented in the storage section 88.

The actual image arrangement section 141 controls the reception section 89$r$ and receives an actual image transmitted from another client terminal 12, which is not shown in the figures, such as the client terminal 12-A of FIG. 1, and causes the actual image storage section 144 to store it in association with user information of a user specified as the distribution destination. Further, the actual image arrangement section 141 generates a thumbnail image of the actual image, and causes the actual image storage section 144 to store it along with the actual image.

The conversion section 142 converts the actual image stored in the actual image storage section 144 into a converted image. User information the same as that of the actual image is also associated with the converted image. The conversion section 142 causes the converted image storage section 145 to store the converted image.

The distribution section 143 has an actual image distribution section 161 and a converted image distribution section 162, and distributes the actual image and the thumbnail image to the client terminal 12 of the user of the distribution destination, by controlling the transmission section 89$s$.

In the case where access has been received from the client terminal 12 of the user specified as the distribution destination of the actual image, the actual image distribution section 161 distributes the actual image and the thumbnail image to the client terminal 12.

In the case where a reproduction instruction of a converted image has been received from the client terminal 12, the converted image distribution section 162 reads the converted image to which reproduction has been specified from the converted image storage section 145, and distributes it to the client terminal 12. In the case where the client terminal 12 is acquiring the actual image, or the client terminal 12 does not have a license required for reproduction of the actual image, a reproduction instruction of a converted image is transmitted from the client terminal 12.

On the other hand, the client terminal 12 is constituted from an actual image acquisition section 181, a display control section 182, a reproduction section 183, an actual image storage section 184, and a license information storage section 185. The actual image acquisition section 181, the display control section 182 and the reproduction section 183 are implemented by having prescribed programs executed by the CPU 111, and the actual image storage section 184 and the license information storage section 185 are implemented in the storage section 118.

The actual image acquisition section 181 controls the reception section 119$r$, acquires the actual image distributed from the server 11, and causes the actual image storage section 184 to store it.

The display control section 182 causes the display section 117$d$ to display a window 21 such as shown in FIG. 2 and FIG. 3, based on the data acquired by performing reproduction of the thumbnail image received by the reception section 119$r$, or the actual image or converted image by the reproduction section 183.

The reproduction section 183 has an actual image reproduction section 201 and a converted image reproduction section 202.

In the case where reproduction of the actual image has been specified, the actual image reproduction section 201 confirms whether or not a license of the actual image to which reproduction has been specified is stored in the license information storage section 185. Note that, the license information is information required for reproduction of the actual image.

Further, in the case where reproduction of the actual image has been specified, the actual image reproduction section 201 confirms whether or not the actual image for reproduction has been acquired. Here, being acquired is said to be when the actual image in prescribed unit parts capable of being reproduced in the actual image reproduction section 201 has been stored in the actual image storage section 184. The prescribed units are not particularly limited, and may be the entire actual image (from start until finish), or may be a part of the actual image (a prescribed time part or the like).

In the case where a license of the actual image to be reproduced is stored, and in the case where the actual image to be reproduced has been acquired, the actual image reproduction section 201 reproduces the actual image stored in the actual image storage section 184. Data obtained by reproducing the actual image is supplied to the display control section 182, and display is performed.

In the case where a license for the actual image to be reproduced is not stored, or in the case where the actual image for reproduction is being acquired, the converted image reproduction section 202 transmits a reproduction instruction of a converted image to the server 11 via the transmission section 119s. Then, since converted images will be successively distributed from the server 11, the reception section 119r will successively receive the converted images.

The converted image reproduction section 202 performs streaming reproduction of the converted images successively received in the reception section 119r. Then, the display control section 182 performs a control so as to cause a window of the display section 117d to display the converted images to which streaming reproduction is performed by the converted image reproduction section 202. In this case, the display control section 182 causes the window 51 shown in FIG. 3, for example, which is a window different to the window in which the thumbnail images are displayed, to display the converted images.

[Image Storage Process]

The operations of the server 11 and the client terminal 12 which have configurations such as those described above will be described. First of all, the flow of an image storage process, in which the server 11 stores actual images and converted images, will be described.

Figure 7:
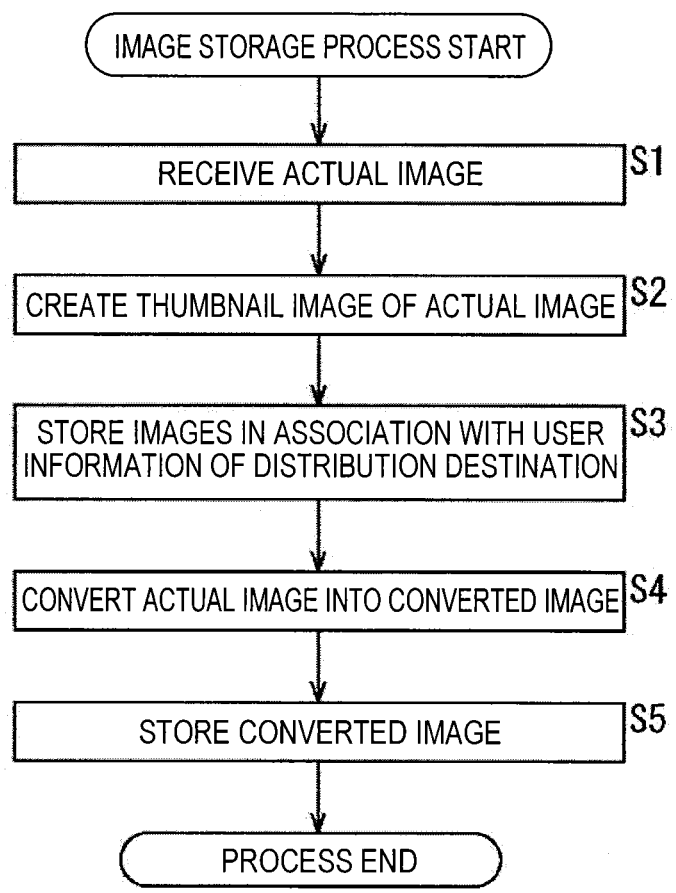
FIG. 7 is a flow chart which describes an image storage process of the server.

FIG. 7 is a flow chart which describes an example of the flow of the image storage process.

In step S1, the reception section 89r receives an actual image provided from the client terminal 12.

In step S2, the actual image arrangement section 141 creates a thumbnail image of the actual image received in the reception section 89r.

In step S3, the actual image arrangement section 141 causes the actual image storage section 144 to store the actual image and the thumbnail image in association with user information of a user of the distribution destination of the actual image.

In step S4, the conversion section 142 converts the actual image stored in the actual image storage section 144 into a converted image.

In step S5, the converted image storage section 145 stores the converted image converted by the conversion section 142. In this way, the image storage process ends.

[Image Distribution Process]

Next, the flow of an image distribution process, in which the server 11 distributes an actual image, a thumbnail image and a converted image to the client terminal 12, will be described.

Figure 8:
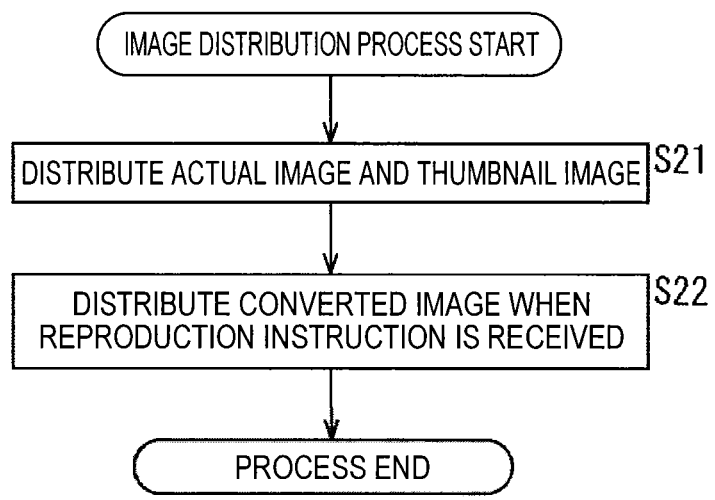
FIG. 8 is a flow chart which describes an image distribution process of the server.

FIG. 8 is a flow chart which describes an example of the flow of the image distribution process.

In step S21, when access has been received from the client terminal 12 of a user specified as the distribution destination for the actual image, the actual image distribution section 161 distributes the actual image and the thumbnail image to the client terminal 12.

Then, the client terminal 12 displays the thumbnail image, by acquiring the actual image. The client terminal 12 sets the actual image of the thumbnail image, to which a reproduction instruction to be selected has been received, from among the displayed thumbnail images, as a reproduction target.

Then, in the case where the actual image to be reproduced has been acquired, the client terminal 12 reproduces the actual image. On the other hand, in the case where the actual image to be reproduced is being acquired from the server 11 or does not have a license, the client terminal 12 transmits a reproduction instruction of a converted image to the server 11. Note that, such a series of processes of the client terminal 12 will be described afterwards by referring to FIG. 9.

In step S22, when the reproduction instruction of a converted image is received from the client terminal 12, the converted image distribution section 162 distributes a converted image to the client terminal 12 of the user of the distribution destination.

Then, the client terminal 12 performs streaming reproduction of the received converted image. In this way, the image distribution process ends.

[Image Reproduction Process]

Next, the flow of an image reproduction process, in which the client terminal 12 reproduces an actual image or a converted image, will be described.

Figure 9:
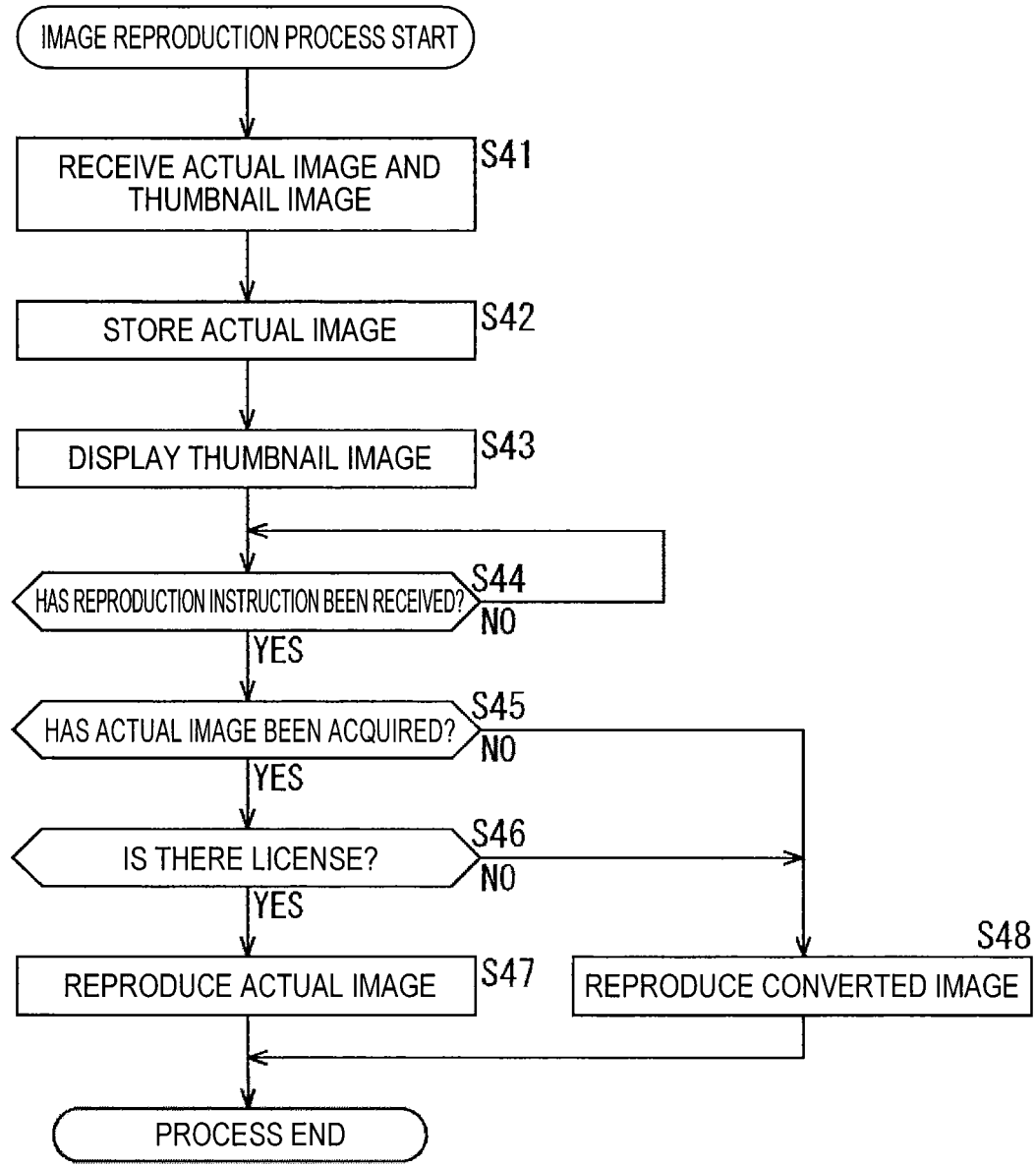
FIG. 9 is a flow chart which describes an image reproduction process of the client terminal.

FIG. 9 is a flow chart which describes an example of the flow of the image reproduction process. The image reproduction process starts when the client terminal 12 specified for the distribution destination accesses the server 11.

In step S41, the reception section 119r receives an actual image and a thumbnail image from the server 11. Then, the actual image acquisition section 181 acquires the actual image received by the reception section 119r.

In step S42, the actual image storage section 184 stores the actual image acquired by the actual image acquisition section 181.

In step S43, the display control section 182 performs a control so as to cause the display section 117d to display thumbnail images received by the reception section 119r. In this way, as shown in FIG. 2 and FIG. 3, thumbnail images are arranged in a line within the window 21.

In step S44, the reproduction section 183 judges whether or not a reproduction instruction of the actual image has been received from a user who operates the client terminal 12. That is, the reproduction section 183 judges whether or not a reproduction instruction has been received, by the actual image of the thumbnail image selected by the user from among the thumbnail images displayed on the display section 117d.

In the case where it is judged in step S44 that a reproduction instruction has not been received, the process returns to step S44, and the judgment process of step S44 is repeated until a reproduction instruction is received. Afterwards, when a reproduction instruction is received, the process proceeds to step S45. In this case, an actual image of the thumbnail image to which a reproduction instruction has been received is set as a reproduction target.

In step S45, the actual image reproduction section 201 judges whether or not the actual image to be reproduced has been acquired.

In the case where it is judged in step S45 that the actual image for reproduction has been acquired, the process proceeds to step S46.

In step S46, the actual image reproduction section 201 judges whether or not there is a license of the actual image to be reproduced, that is, whether or not a license of the actual image to be reproduced is stored in the license information storage section 185.

In the case where it is judged in step S46 that there is a license of the actual image to be reproduced, the process proceeds to step S47.

In step S47, the actual image reproduction section 201 reproduces the actual image stored in the actual image storage section 184. Then, the display control section 182 performs a control so as to cause a window of the display section 117*d* to display the actual image reproduced by the actual image reproduction section 201.

On the other hand, in the case where it is judged that an actual image to be reproduced is being acquired in step S45, or in the case where it is judged that there is no license of the actual image to be reproduced in step S46, the process proceeds to step S48.

In step S48, the converted image reproduction section 202 performs streaming reproduction of a converted image. That is, the converted image reproduction section 202 performs streaming reproduction of a converted image distributed from the server 11, based on a reproduction instruction of a converted image transmitted to the server 11. Then, the display control section 182 performs a control so as to cause a window different to the window in which the thumbnail images are displayed, which is a window of the display section 117*d*, to display the converted image which has been streaming reproduced by the converted image reproduction section 202.

When the actual image or the converted image is reproduced, the image generation process ends.

[Reproduction Technique of a Converted Image]

As described above, in the case where the actual image to be reproduced is being acquired from the server 11, or the client terminal 12 does not have a license required for reproduction of the actual image to be reproduced, a converted image will be reproduced by the client terminal 12. In this way, a reproduction technique of a converted image, in the case where the actual image to be reproduced is being acquired from the server 11, from among the cases where a converted image is to be reproduced by the client terminal 12, will be described by using FIG. 10 and FIG. 11.

As shown in FIG. 3, the converted image is displayed and is streaming reproduced by the client terminal 12, in a window 51 different to the window 21 in which the thumbnail image 31 is displayed, while acquiring the actual image to be reproduced.

Streaming reproduction of the converted image in the window 51 may be continued until the end of the converted image. However, in the case where acquisition of the actual image to be reproduced has finished during streaming reproduction of the converted image, streaming reproduction of the converted image is stopped, and may be switched to reproduction of the actual image in the window 21.

In this case, generation of the actual image is started from the position at which streaming reproduction of the converted image has been stopped. That is, the client terminal 12 inquiries to the server 11 for a reproduction position of the converted image, when acquisition of the actual image has finished. The client terminal 12 starts reproduction of the actual image, based on information of the reproduction position transmitted from the server 11 with respect to the inquiry of the reproduction position.

[Reproduced Image Switching Process]

Figure 10:
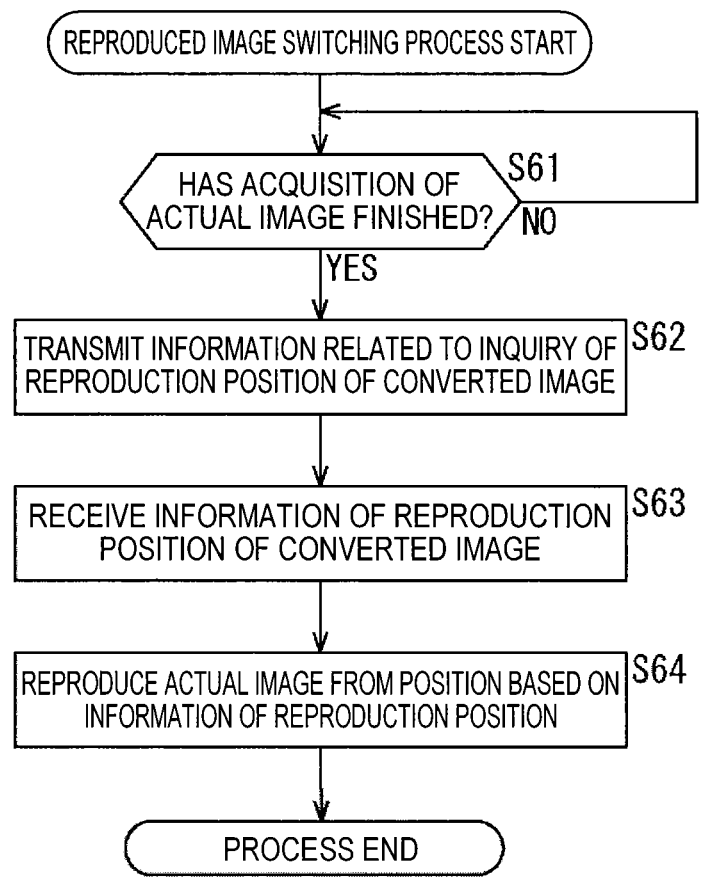
FIG. 10 is a flow chart which describes a reproduced image switching process of the client terminal.

FIG. 10 is a flow chart which shows an example of the flow of a reproduced image switching process, in which the client terminal 12 switches the image to be reproduced.

In the client terminal 12, the actual image is being acquired, and the converted image is being streaming reproduced, in a window different to the window in which the thumbnail images are displayed.

In step S61, the actual image reproduction section 201 of the client terminal 12 judges whether or not acquisition of the actual image has finished.

In the case where it is judged in step S61 that acquisition of the actual image has not finished, the process returns to step S61, and the judgment process of step S61 is repeated until acquisition of the actual image is finished. During this time, a converted image is streaming reproduced, in a window different to the window in which the thumbnail image is displayed. Afterwards, when acquisition of the actual image is finished, the process proceeds to step S62.

In step S62, the converted image reproduction section 202 transmits information related to an inquiry of the reproduction position of the converted image to the server 11 via the transmission section 119*s*.

Then, the server 11 transmits information of the reproduction position of the converted image to the client terminal 12, by receiving information related to the inquiry of the reproduction position of the converted image. Note that, such a series of processes of the server 11 side will be described later by referring to FIG. 11.

In step S63, the reception section 119*r* receives information of the reproduction position of the converted image from the server 11.

In step S64, the actual image reproduction section 201 reproduces the actual image to which acquisition has been completed from the position based on the information of the reproduction position. That is, the actual image reproduction section 201 reproduces the actual image, by setting the position represented by the information of the reproduction position as a start position. In this way, the reproduced image switching process ends.

[Reproduction Position Information Transmission Process]

Figure 11:
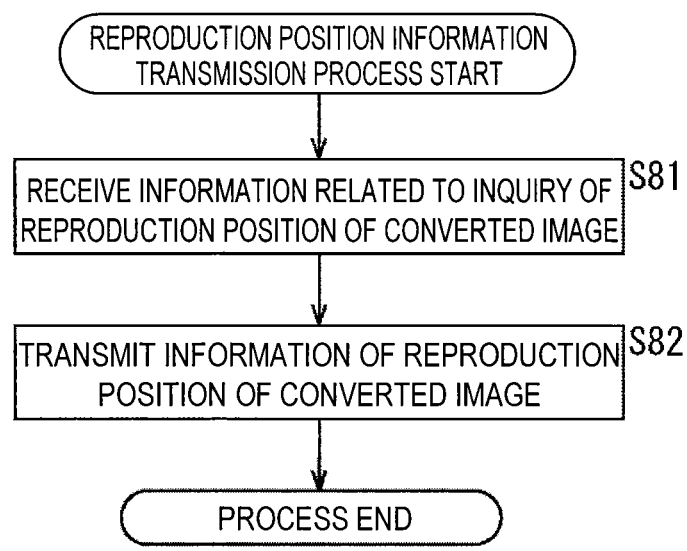
FIG. 11 is a flow chart which describes a reproduction position information transmission process of the client terminal.

FIG. 11 is a flow chart which describes an example of the flow of a reproduction position information transmission process, in which the server 11 transmits a reproduction position of the converted image to the client terminal 12.

When acquisition of the actual image is finished in the client terminal 12, information related to an inquiry of the reproduction position of the converted image is transmitted from the client terminal 12.

In step S81, the reception section 89*r* of the server 11 receives information related to the inquiry of the reproduction position of the converted image.

In step S82, the converted image distribution section 162 transmits information of the reproduction position of the converted image to the client terminal 12.

Then, in the client terminal 12, an actual image is reproduced in the window in which the thumbnail image is displayed, based on information of the reproduction position of the converted image transmitted from the server 11. In this way, the reproduction position information transmission process ends.

In this way, by having the client terminal 12 switch the image to be reproduced when acquisition of the actual image has been completed, a user can start to view a high-quality image, smoothly and without interrupting the viewing.

[Application to a Program of the Present Disclosure]

The above described series of processes can be executed by hardware, or can be executed by software. In the case where the series of processes are executed by software, programs constituting this software are installed in a computer. Here, for example, a computer in which specialized hardware is built in, a general purpose personal computer, which is capable of executing various types of functions in the computer by installing various types of programs, or the like are included in the computer.

For example, the above described series of process is performed in the server 11 of FIG. 4 or the client terminal 12 of FIG. 5, which are examples of computers, by having the CPU 81 of FIG. 4 or the CPU 111 of FIG. 5 execute, for example, programs stored in the storage section 88 of FIG. 4 or the storage section 118 of FIG. 5 by loading in the RAM 83 of FIG. 4 or the RAM 113 of FIG. 5, via the input/output interface 85 of FIG. 4 or the input/output interface 115 of FIG. 5 and the bus 84 of FIG. 4 or the bus 114 of FIG. 5.

For example, programs executed by the computer can be provided by recording to the removable medium 91 of FIG. 4 or the removable medium 121 of FIG. 5 as package media or the like. Further, programs can be provided via a wired or wireless transmission medium, such as a local area network, the internet or a digital satellite broadcast.

In the computer, the programs can be installed in the storage section 88 of FIG. 4 or the storage section 118 of FIG. 5, by mounting the removable medium 91 of FIG. 4 or the removable medium 121 of FIG. 5 in the drive 90 of FIG. 4 or the drive 120 of FIG. 5, via the input/output interface 85 of FIG. 4 or the input/output interface 115 of FIG. 5. Further, the programs can be received by the communication section 89 of FIG. 4 or the communication section 119 of FIG. 5, via the wired or wireless transmission medium, and can be installed in the storage section 88 of FIG. 4 or the storage section 118 of FIG. 5. Additionally, the programs can be installed in advance in the ROM 82 of FIG. 4 or the ROM 112 of FIG. 5 and the storage section 88 of FIG. 4 or the storage section 118 of FIG. 5.

Note that, the programs executed by the computer may be programs performed in a time series process, in accordance with the order described in the present disclosure, or may be programs performed in parallel, or with a necessary timing such as at the time when calling is performed.

The embodiments of the present disclosure are not limited to the above described embodiments, and it is possible to have various changes insofar as they are within the scope of the present disclosure.

For example, the present disclosure can be a configuration of cloud computing which processes one function shared in cooperation with a plurality of apparatuses via a network.

Further, other than being executed by one apparatus, each of the steps described in the above described flow charts can be shared and executed by a plurality of apparatus.

In addition, in the case where a plurality of processes are included in one step, other than being executed by one apparatus, the plurality of processes included in this one step can be shared and executed by a plurality of apparatuses.

Additionally, the present technology may also be configured as below.

(1)

An information processing apparatus, including:

a storage section which stores a first image, which is an image of a format requiring license information in reproduction, to which reproduction is performed by a reproduction apparatus after being acquired;

a conversion section which converts the first image into a second image of a format not requiring license information in reproduction, which is an image with content the same as content of the first image; and a distribution section which distributes the second image to the reproduction apparatus to be reproduced, during acquisition of the first image.

(2)

The information processing apparatus according to (1), wherein the storage section stores information related to a user specified by a user who has provided the first image in association with the first image, and wherein the distribution section distributes the first image and the second image to the reproduction apparatus operated by a specified user.

(3)

The information processing apparatus according to (1) or (2), wherein the storage section stores a thumbnail image of the first image, and wherein the distribution section distributes the thumbnail image to the reproduction apparatus, and distributes the second image, obtained by converting the first image selected by using the thumbnail image, to the reproduction apparatus.

(4)

The information processing apparatus according to any one of (1) to (3), wherein the second image is an image with a data amount less than a data amount of the first image, and to which streaming reproduction is performed.

(5)

The information processing apparatus according to any one of (1) to (4), wherein the distribution section transmits information of a reproduction position to the reproduction apparatus, in accordance with an inquiry of a reproduction position of the second image performed from the reproduction apparatus at the time when acquisition of the first image has finished.

(6)

An information processing method including steps of:

storing a first image, which is an image of a format requiring license information in reproduction, to which reproduction is performed by a reproduction apparatus after being acquired;

converting the first image into a second image of a format not requiring license information in reproduction, which is an image with content the same as content of the first image; and distributing the second image to the reproduction apparatus to be reproduced, during acquisition of the first image.

(7)

A program for causing a computer to function as:

a storage section which stores a first image, which is an image of a format requiring license information in reproduction, to which reproduction is performed by a reproduction apparatus after being acquired;

a conversion section which converts the first image into a second image of a format not requiring license information in reproduction, which is an image with content the same as content of the first image; and a distribution section which distributes the second image to the reproduction apparatus to be reproduced, during acquisition of the first image.

(8)

A reproduction apparatus, including:

a reception section which receives a first image, which is an image of a format requiring license information in reproduction, to which reproduction is performed after being acquired, and receives a second image of a format not requiring license information in reproduction, which is an image with content the same as content of the first image, during acquisition of the first image;

a storage section which stores the received first image; and a reproduction section which starts reproduction of the received second image during acquisition of the first image.

(9)

The reproduction apparatus according to (8), wherein, in the case where acquisition of the first image has finished, and it has the license information, the reproduction section reproduces the first image.

(10)

The reproduction apparatus according to (8) or (9), further including:

a display control section which controls display of the first image and the second image reproduced by the reproduction section.

(11)

The reproduction apparatus according to any one of (8) to (10), wherein the reception section receives a thumbnail image of the first image, and wherein the display control section further causes the thumbnail image to be displayed side by side within a window.

(12)

The reproduction apparatus according to any one of (8) to (11), wherein the reception section receives the second image, obtained by converting the first image selected by a user by using the thumbnail image displayed by the display control section, and wherein the display control section causes a window different to the window displaying the thumbnail image to display the second image reproduced by the reproduction section.

(13)

The reproduction apparatus according to any one of (8) to (12), wherein the second image is an image with a data amount less than a data amount of the first image, and to which streaming reproduction is performed.

(14)

The reproduction apparatus according to any one of (8) to (13), further including:

a transmission section which transmits information related to an inquiry of a reproduction position of the second image to an information processing apparatus which transits the first image and the second image, at the time when acquisition of the first image has finished, wherein the reception section receives the information of the reproduction position transmitted from the information processing apparatus in accordance with an inquiry, and wherein the reproduction section reproduces the second image by setting a position represented by the information of the reproduction position as a start position.

(15)

A reproduction method including the steps of:

receiving a first image, which is an image of a format requiring license information in reproduction, to which reproduction is performed after being acquired, and receiving a second image of a format not requiring license information in reproduction, which is an image with content the same as content of the first image, during acquisition of the first image;

storing the received first image; and starting reproduction of the received second image during acquisition of the first image.

(16)

A program for causing a computer to function as:

a reception section which receives a first image, which is an image of a format requiring license information in reproduction, to which reproduction is performed after being acquired, and receives a second image of a format not requiring license information in reproduction, which is an image with content the same as content of the first image, during acquisition of the first image;

a storage section which stores the received first image; and a reproduction section which starts reproduction of the received second image during acquisition of the first image.

(17)

An information processing system, including:

a server including a first storage section which stores a first image, which is an image of a format requiring license information in reproduction, to which reproduction is performed by a reproduction apparatus after being acquired, a conversion section which converts the first image into a second image of a format not requiring license information in reproduction, which is an image with content the same as content of the first image, and a distribution section which distributes the second image to the reproduction apparatus to be reproduced, during acquisition of the first image; and a client terminal including a reception section which receives the first image, and receives the second image during acquisition of the first image, a second storage section which stores the received first image, and a reproduction section which starts reproduction of the received second image during acquisition of the first image.

The present disclosure can be applied to an information processing apparatus used in a service which shares images.

REFERENCE SIGNS LIST 1 information processing system, 11 server, 12 client terminal, 89r reception section, 89s transmission section, 119r reception section, 119s transmission section, 141 actual image arrangement section, 142 conversion section, 143 distribution section, 144 actual image storage section, 145 converted image storage section, 146 reception section, 161 actual image distribution section, 162 converted image distribution section, 181 actual image acquisition section, 182 display control section, 183 reproduction section, 184 actual image storage section, 185 license information storage section

The invention claimed is:

1. An information processing apparatus, comprising:

a storage that stores an actual moving image, which is an image of a format requiring license information in playback, to which playback is performed by a playback apparatus after being acquired; and circuitry configured to convert the actual moving image into a converted moving image of a format not requiring license information in playback, which is an image with a same content as content of the actual moving image, the converted moving image being an image with a data amount less than a data amount of the actual moving image, and to which streaming playback is performed, distribute the actual moving image to the playback apparatus, distribute the converted moving image to the playback apparatus to perform playback when the playback apparatus does not have a license to perform playback of the format of the actual moving image, while distributing the actual moving image to the playback apparatus, send an approval instruction to the playback apparatus to allow the playback apparatus to perform playback of the actual moving image, in response to distribution of the actual moving image to the playback apparatus being completed and the playback apparatus having a license to perform playback of the actual moving image, and transmit information of a playback position to the playback apparatus, in accordance with an inquiry of the playback position of the converted moving image from the playback apparatus at a time when distribution of the actual moving image to the playback apparatus is completed.

2. The information processing apparatus according to claim 1,
wherein the storage stores information related to a user specified by a user who has provided the actual moving image in association with the actual moving image.

3. The information processing apparatus according to claim 1,
wherein the storage stores a thumbnail image of the actual moving image, and
wherein the circuitry is configured to distribute the thumbnail image to the playback apparatus, and distribute the converted moving image, obtained by converting the actual moving image selected by using the thumbnail image, to the playback apparatus.

4. An information processing method, comprising:
storing an actual moving image, which is an image of a format requiring license information in playback, to which playback is performed by a playback apparatus after being acquired;
converting the actual moving image into a converted moving image of a format not requiring license information in playback, which is an image with a same content as content of the actual moving image, the converted moving image being an image with a data amount less than a data amount of the actual moving image, and to which streaming playback is performed;
distributing the actual moving image to the playback apparatus;
distributing the converted moving image to the playback apparatus to perform playback when the playback apparatus does not have a license to perform playback of the format of the actual moving image, while distributing the actual moving image to the playback apparatus;
sending an approval instruction to the playback apparatus to allow the playback apparatus to perform playback of the actual moving image, in response to distribution of the actual moving image to the playback apparatus being completed and the playback apparatus having a license to perform playback of the actual moving image; and
transmitting information of a playback position to the playback apparatus, in accordance with an inquiry of the playback position of the converted moving image from the playback apparatus at a time when distribution of the actual moving image to the playback apparatus is completed.

5. A non-transitory computer-readable storage medium including computer executable instructions, wherein the instructions, when executed by a computer, cause the computer to perform a method, the method comprising:
storing an actual moving image, which is an image of a format requiring license information in playback, to which playback is performed by a playback apparatus after being acquired;
converting the actual moving image into a converted moving image of a format not requiring license information in playback, which is an image with a same content as content of the actual moving image, the converted moving image being an image with a data amount less than a data amount of the actual moving image, and to which streaming playback is performed;
distributing the actual moving image to the playback apparatus;
distributing the converted moving image to the playback apparatus to perform playback when the playback apparatus does not have a license to perform playback of the format of the actual moving image, while distributing the actual moving image to the playback apparatus;
sending an approval instruction to the playback apparatus to allow the playback apparatus to perform playback of the actual moving image, in response to distribution of the actual moving image to the playback apparatus being completed and the playback apparatus having a license to perform playback of the actual moving image; and
transmitting information of a playback position to the playback apparatus, in accordance with an inquiry of the playback position of the converted moving image from the playback apparatus at a time when distribution of the actual moving image to the playback apparatus is completed.

6. A playback apparatus, comprising:
circuitry configured to
receive an actual moving image, which is an image of a format requiring license information in playback, to which playback is performed after being acquired, and receive a converted moving image of a format not requiring license information in playback, which is an image with a same content as content of the actual moving image, during acquisition of the actual moving image, the playback apparatus receiving the converted moving image to perform playback when the playback apparatus does not have a license to perform playback of the format of the actual moving image, the converted moving image being an image with a data amount less than a data amount of the actual moving image, and to which streaming playback is performed; and
a storage that stores the received actual moving image, wherein
the circuitry is configured to
start playback of the received converted moving image during acquisition of the actual moving image,
receive an approval instruction to allow the playback apparatus to perform playback of the actual moving image, in response to acquisition of the actual moving image by the playback apparatus being completed and the playback apparatus having a license to perform playback of the actual moving image, transmit information related to an inquiry of a playback position of the converted moving image to an information processing apparatus which transits the actual moving image and the converted moving image, in response to acquisition of the actual moving image by the playback apparatus being completed, and receive information of the playback position transmitted from the information processing apparatus.

7. The reproduction playback apparatus according to claim 6,
wherein, in response to acquisition of the actual moving image by the playback apparatus being completed and the playback apparatus having the license to perform playback of the actual moving image, the circuitry is configured to reproduce the actual moving image.

8. The playback apparatus according to claim 6,
wherein the circuitry is configured to control display of the actual moving image and the converted moving image that is reproduced.

9. The playback apparatus according to claim 8, wherein the circuitry is configured to
receive a thumbnail image of the actual moving image, and
cause the thumbnail image to be displayed side by side within a window.

10. The playback apparatus according to claim 9, wherein the circuitry is configured to
receive the converted moving image, obtained by converting the actual moving image selected by a user by using the thumbnail image displayed, and
cause a window different to the window displaying the thumbnail image to display the converted moving image reproduced.

11. The playback apparatus according to claim 6, wherein the circuitry is further configured to
reproduce the converted moving image by setting a position represented by the information of the playback position as a start position.

12. A playback method for a playback apparatus, the playback method comprising:
receiving an actual moving image, which is an image of a format requiring license information in playback, to which playback is performed after being acquired, and receiving a converted moving image of a format not requiring license information in playback, which is an image with a same content as content of the actual moving image, during acquisition of the actual moving image, the playback apparatus receiving the converted moving image to perform playback when the playback apparatus does not have a license to perform playback of the format of the actual moving image, the converted moving image being an image with a data amount less than a data amount of the actual moving image, and to which streaming playback is performed;
storing the received actual moving image;
starting playback of the received converted moving image during acquisition of the actual moving image;
receiving an approval instruction to allow the playback apparatus to perform playback of the actual moving image, in response to acquisition of the actual moving image by the playback apparatus being completed and the playback apparatus having a license to perform playback of the actual moving image;
transmitting information related to an inquiry of a playback position of the converted moving image to an information processing apparatus which transits the actual moving image and the converted moving image, in response to acquisition of the actual moving image by the playback apparatus being completed; and
receiving information of the playback position transmitted from the information processing apparatus.

13. A non-transitory computer-readable storage medium including computer executable instructions, wherein the instructions, when executed by a playback apparatus, cause the playback apparatus to perform a method, the method comprising:
receiving an actual moving image, which is an image of a format requiring license information in playback, to which playback is performed after being acquired, and receives a converted moving image of a format not requiring license information in playback, which is an image with a same content as content of the actual moving image, during acquisition of the actual moving image, the playback apparatus receiving the converted moving image to perform playback when the playback apparatus does not have a license to perform playback of the format of the actual moving image, the converted moving image being an image with a data amount less than a data amount of the actual moving image, and to which streaming playback is performed;
storing the received actual moving image;
starting playback of the received converted moving image during acquisition of the actual moving image;
receiving an approval instruction to allow the playback apparatus to perform playback of the actual moving image, in response to acquisition of the actual moving image by the playback apparatus being completed and the playback apparatus having a license to perform playback of the actual moving image;
transmitting information related to an inquiry of a playback position of the converted moving image to an information processing apparatus which transits the actual moving image and the converted moving image, in response to acquisition of the actual moving image by the playback apparatus being completed; and
receiving information of the playback position transmitted from the information processing apparatus.

14. An information processing system, comprising:
a client terminal; and
a server including
a first storage that stores an actual moving image, which is an image of a format requiring license information in playback, to which playback is performed by the client terminal after being acquired, and
server circuitry configured to
convert the actual moving image into a converted moving image of a format not requiring license information in playback, which is an image with a same content as content of the actual moving image, the converted moving image being an image with a data amount less than a data amount of the actual moving image, and to which streaming playback is performed,
distribute the converted moving image to the client terminal to perform playback when the client terminal does not have a license to perform playback of the format of the actual moving image, while distributing the actual moving image to the client terminal,
send an approval instruction to the client terminal to allow the client terminal to perform playback of the actual moving image, in response to distribution of the actual moving image to the client terminal being completed and the client terminal having a license to perform playback of the actual moving image, and transmit information of a playback position to the client terminal, in accordance with an inquiry of the playback position of the converted moving image from the client terminal at a time when distribution of the actual moving image to the client terminal is completed, wherein the client terminal includes client circuitry configured to receive the actual moving image, and receive the converted moving image during acquisition of the actual moving image, and a second storage that stores the received actual moving image, wherein the client circuitry is configured to start playback of the received converted moving image during acquisition of the actual moving image.

* * * * *